UNITED STATES PATENT OFFICE.

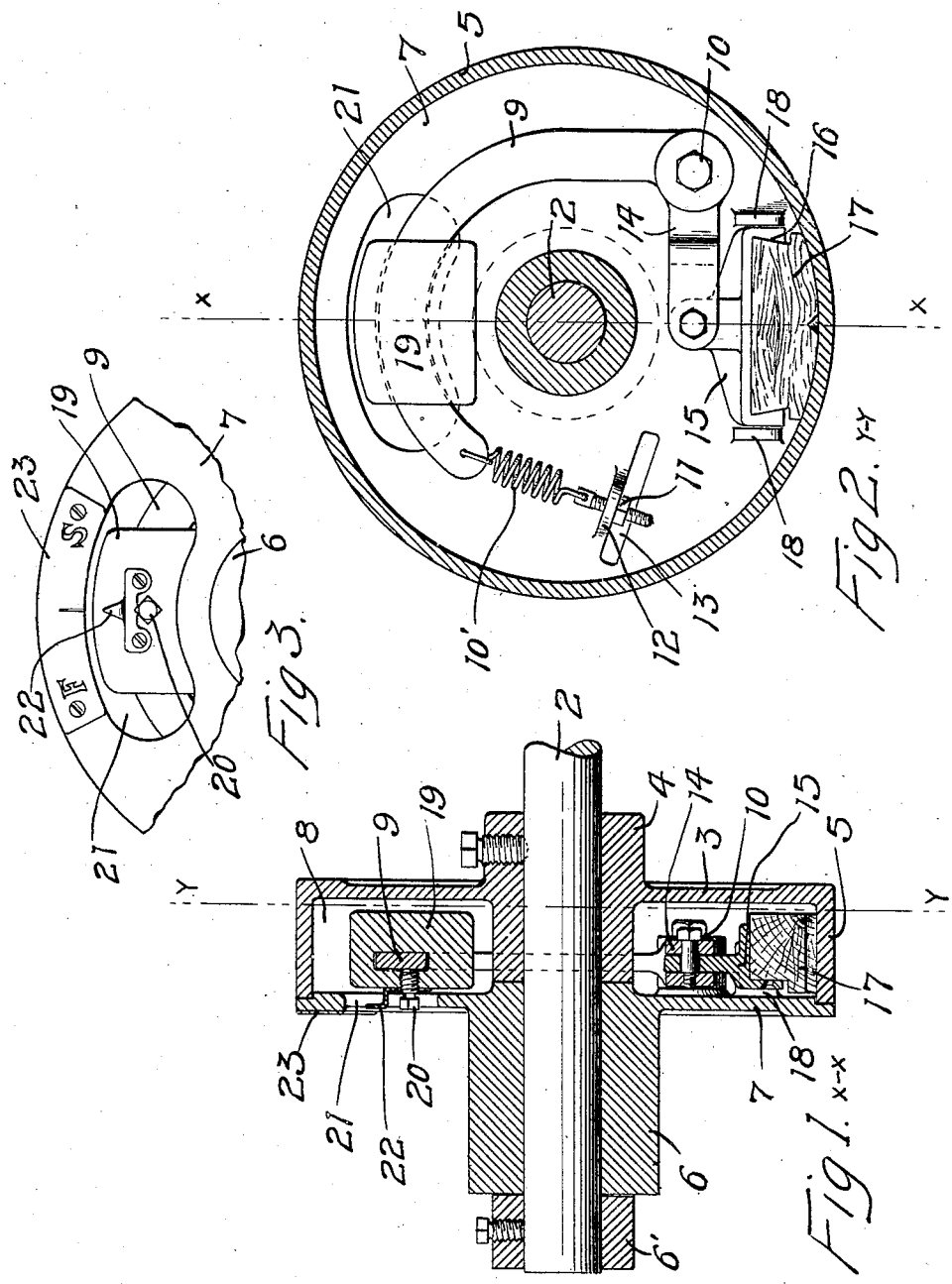

MICHAEL M. BIERLINE, OF MINNEAPOLIS, MINNESOTA, ASSIGNOR OF ONE-HALF TO JOSEPH L. WILLFORD, OF MINNEAPOLIS, MINNESOTA.

FRICTION-PULLEY.

No. 863,691.     Specification of Letters Patent.     Patented Aug. 20, 1907.

Application filed October 29, 1906. Serial No. 340,956.

*To all whom it may concern:*

Be it known that I, MICHAEL M. BIERLINE, of Minneapolis, Hennepin county, Minnesota, have invented certain new and useful Improvements in Friction-Pulleys, of which the following is a specification.

The object of this invention is to provide a friction pulley by means of which cream separators, dynamos, motors, and other machines can be driven at a predetermined speed.

A further object is to provide a pulley having but few parts and hence inexpensive to manufacture and maintain.

A further object is to provide a pulley that is capable of adjustment when in use to adapt it for the different degrees of speed desired.

The invention consists generally in various constructions and combinations, all as hereinafter described and particularly pointed out in the claims.

In the accompanying drawings, forming part of this specification, Figure 1 is a sectional view on the line $x$—$x$ of Fig. 2. Fig. 2 is a sectional view on the line $y$—$y$ of Fig. 1. Fig. 3 is a detail view showing the adjustable weight provided in connection with the clutch device.

In the drawing, 2 represents a driven shaft and 3 a disk having a hub 4 secured on said shaft and provided with a peripheral flange 5.

6 represents a pulley loosely mounted on the shaft and held in place by a collar 6' and having a radial flange 7 on one end adapted to fit snugly against the edge of the flange 5 and form therewith, and with the disk 3, an annular chamber 8, wherein the clutch device is located.

9 is a curved lever pivoted at 10 on the flange 7 and extending around the shaft to the opposite side thereof and connected to one end of a tension spring 10' whose opposite end is adjustably connected by means of a threaded pin and lock nut 11 to a lug 12 on the flange 7. A slot 13 is provided in said flange opposite the lock nut to permit access thereto for the purpose of adjusting the pin and regulating the tension of the spring. At the other end of the lever 9 an arm 14 is provided, projecting outwardly from the pivot 10 and pivotally connected to a shoe 15 that has a dove-tailed socket 16 to receive a bearing block 17 of wood or other suitable material, the outer face of said bearing block being curved and adapted to engage the inner face of the flange 5 and be held normally in contact therewith by the tension of the spring 10'. Guiding lugs 18 are provided on the flange 7 between which the shoe 16 is adapted to slide radially and be guided to and from the friction surface of the flange 5. The shoe hangs loosely between the guides and tilts back and forth on its pivot to seat the block firmly against the friction surface. On the curved lever 9 I provide a weight 19 adjustable thereon and secured by means of a set screw 20 that is accessible through an opening 21 in the flange 7 for the purpose of adjusting the weight back and forth on the lever according to the degree of speed desired before the pulley becomes inoperative. A pointer 22 is preferably mounted on the weight and a plate 23 with letters indicating "fast" and "slow" is secured on the outer face of the flange 7 and indicates to the operator the proper position to adjust the weight to obtain the speed desired before the clutch is rendered inoperative by the disengagement of the bearing block from the friction surface.

In operation, the weight will be adjusted on the lever 9 and the tension of the spring 10 regulated to hold the frictional bearing block in engagement with the surface of the flange 5 to normally lock the pulley. If the speed rises above the limit for which the weight is set it will be thrown outward overcoming the spring and releasing the pulley. The movement of the shoe and its bearing block will be in a direct radial line from the center of the shaft and its contact with the friction surface will be insured. At any time the weight can be adjusted on its supporting lever and the tension of the spring 10' can be changed without taking the pulley from the shaft.

I claim as my invention:—

1. The combination, with a driven shaft, of a disk secured thereon and having a peripheral flange, a pulley loosely mounted on said shaft and having a radial flange the outer edge of said flange bearing on the edge of said peripheral flange and forming therewith and said disk an annular chamber, a lever pivoted at one end on said radial flange within said chamber and having its other end curved around said shaft to the opposite side thereof from said pivoted end, a weight mounted on the curved end of said lever, a spring connecting said curved end with said radial flange, said lever having an arm projecting from its pivotal point, a shoe pivotally supported by said arm, a bearing block carried by said shoe and adapted to engage the inner surface of said peripheral flange and normally held in contact therewith by the tension of said spring until released by the outward movement of said weight when the speed of the shaft rises above a predetermined degree, substantially as described.

2. The combination, with a driven shaft, of a disk having a hub secured thereon and provided with a peripheral friction surface, a pulley loosely mounted on said shaft and having a radial flange, a lever pivoted on said flange, a weight carried by said lever, a shoe pivotally supported on said lever, a bearing block carried by said shoe and adapted to engage said friction surface, guiding lugs provided on said disk and between which said shoe moves radially toward and from said friction surface and whereby the perfect seating of said shoe is insured, and a spring device arranged to normally press said shoe outwardly toward said surface, substantially as described.

3. The combination, with a driven shaft, of a disk having a hub secured thereon and provided with a peripheral flange having a friction surface, a pulley loosely mounted on said shaft and having a radial flange arranged to engage the edge of said peripheral flange and form therewith and said disk an annular chamber, a lever pivoted on said radial flange within said chamber, a shoe having a bearing block carried by said lever adapted to engage said friction surface, a weight mounted on said lever, a coil spring connected at one end to said lever and having a threaded pin and lock nut connection at its other end with said radial flange and normally holding said block against said friction surface, and said flange having a slotted opening near said pin and lock nut through which access may be had thereto and whereby the tension of said spring can be regulated without separating the pulley from said disk.

4. The combination, with a driven shaft, of a disk having a hub secured thereon and provided with a peripheral flange having a friction surface, a pulley loosely mounted on said shaft and having a radial flange engaging said peripheral flange and forming therewith and said disk an annular chamber, a lever pivoted on said flange in said chamber, a shoe pivoted on said lever and having a bearing block adapted to engage said friction surface, a spring device normally holding said bearing block in engagement with said surface, a weight adjustably mounted on said lever and said flange having an opening opposite said weight and through which access may be had thereto, whereby the proper position of the weight on said lever to obtain the desired speed of the pulley can be ascertained.

In witness whereof, I have hereunto set my hand this 22d day of October, 1906.

MICHAEL M. BIERLINE.

Witnesses:
 RICHARD PAUL,
 J. B. ERA.